United States Patent
Albella et al.

(10) Patent No.: US 6,831,703 B2
(45) Date of Patent: Dec. 14, 2004

(54) METHOD AND CIRCUIT FOR THE STORAGE OF DIGITAL DATA AND TELEVISION SET IMPLEMENTING SAID STORAGE METHOD

(75) Inventors: Arnaud Albella, Aix En Provence (FR); Vincent Tauzia, Aix En Provence (FR)

(73) Assignee: STMicroelectronics SA, Montrouge (FR)

( * ) Notice: Subject to any disclaimer, the term of this patent is extended or adjusted under 35 U.S.C. 154(b) by 355 days.

(21) Appl. No.: 10/032,333

(22) Filed: Dec. 18, 2001

(65) Prior Publication Data

US 2002/0093589 A1 Jul. 18, 2002

(30) Foreign Application Priority Data

Dec. 21, 2000 (FR) ............................................. 00 16851

(51) Int. Cl.[7] .......................... H04N 7/00; H04N 11/00
(52) U.S. Cl. ....................... 348/468; 348/465; 348/714
(58) Field of Search ............................... 348/468, 466, 348/461, 465, 714, 715, 716, 725, 473; 345/551; H04N 7/00, 11/00

(56) References Cited

U.S. PATENT DOCUMENTS

| | | | | |
|---|---|---|---|---|
| 5,635,987 A | * | 6/1997 | Park et al. | 348/468 |
| 5,777,684 A | * | 7/1998 | Gyarmati et al. | 348/468 |
| 6,043,849 A | * | 3/2000 | Imanaka et al. | 348/468 |
| 6,064,439 A | * | 5/2000 | Kimura et al. | 348/468 |
| 6,545,720 B1 | * | 4/2003 | Tauzia et al. | 348/468 |

FOREIGN PATENT DOCUMENTS

WO  00/35197  6/2000  .......... H04N/7/088

OTHER PUBLICATIONS

Kinghorn, *New Multipage Teletext Decoders*, Proceedings of the International Conference on Consumer Electronics, Rosemont, Jun. 5–7, 1991, New York, IEEE, US, vol. Conf. 10, Jun. 5, 1991, pp. 266–267, XP000289031.

Kinghorn, *New Multipage Teletext Decoders*, Transactions on Consumer Electronics, IEEE Inc., New York, US, vol. 37, No. 3, Aug. 1, 1991, pp. 441–448, XP000263221.

\* cited by examiner

*Primary Examiner*—Sherrie Hsia
(74) *Attorney, Agent, or Firm*—Allen, Dyer, Doppelt, Milbrath & Gilchrist, P.A.; Lisa K. Jorgenson

(57) ABSTRACT

A method for storing pages of a teletext service, with at least one page being received by a storage circuit of a television receiver, is provided. The storage circuit includes a data memory for storing the at least one received page. The method includes extracting a reference number from the at least one received page, checking whether the at least one received page is a requested page, and evaluating contents of the data memory to decide whether the at least one received page is to be stored as a function of free space in the data memory and an importance of the at least one received page. The method also includes storing the at least one received page if it is decided that the at least one received page is to be stored.

24 Claims, 2 Drawing Sheets ated the display of a new page
METHOD AND CIRCUIT FOR THE STORAGE OF DIGITAL DATA AND TELEVISION SET IMPLEMENTING SAID STORAGE METHOD

FIELD OF THE INVENTION

The present invention relates to the reception of video signals, and more particularly, to the storage of teletext type digital data.

BACKGROUND OF THE INVENTION

Teletext is an ancillary service of television stations designed for the transmission of written information in addition to video information. This written information is displayed on the screen of a television set in the form of teletext pages. Each page is conveyed in the form of a variable number of data packets transmitted in the time intervals corresponding to the frame flyback between two images. A teletext service including a set of numbered pages is thus transmitted non-stop and in cycles. The transmission can be made in the chronological order of pages, but this is not necessary.

A full teletext service of a television station may comprise, for example, 500 pages. Page 100 of the service generally corresponds to a contents page of the service indicating the theme and the reference number (or page number) of certain pages of the service. The total pages of the service is broadcast in cycles, and a broadcasting cycle approximately lasts several tens of seconds. This enables a user to watch the service without necessarily storing all the pages. Broadcasting in cycles also enables the broadcasting station to regularly update its teletext service.

In general, to request the display of a page of the service, the user indicates the page number via a remote control. Through shift commands of the "next page/previous page" type, the user can furthermore move from one page to another in the service. With known navigation systems, such as the TOP or FLOF systems, the user can move about more easily in the service and request the display of a page of his choice without necessarily knowing the corresponding reference number.

For example, with the TOP system, the service is divided into blocks (or subject headings, such as sports) and each block is divided into one or more groups (or sub-headings, such as tennis) comprising a variable number of pages. The system works as follows. When a page of the service is displayed, the TOP navigation system displays a complement at the bottom of the screen. This complement comprises a list of pages close to the page displayed in the form of color links, with each link referring to a nearby page. The user can then very easily access the pages of a group or a block by a remote control. The user no longer needs to search for their reference number by going through the contents page, for example.

Here and throughout the rest of the document, the expressions "close", "near", "nearby" and "neighboring" must be understood in the broad sense. A page Y is said to be close to a page X if, when the page X is displayed on the screen, there is a high probability that the user will request the display of the page Y.

For example, pages having consecutive reference numbers or almost consecutive reference numbers are close to one another. For example, pages 198, 199, 201, 202 are close to page 200. Similarly, with the TOP navigation system, the first pages of the block, the group, etc., to which the page X belongs are also pages close to the page Y.

A known circuit 10 for the reception and display of a teletext service comprises, according to FIG. 1, a decoder 11, a filter 12, a memory 13, a data memory 14, a display memory 15, display means 16 and a screen 17. The circuit 10 also comprises a data detection circuit coupled to an antenna (not shown) to receive a video signal, extract digital data on a teletext service from this video signal and supply the digital data to the decoder 11.

The memory 13 comprises a list of requested pages identified by their respective reference numbers. The list of requested pages contains references to pages close to the page being displayed, namely pages for which the probability is high that the user will request the display rapidly. The reference numbers contained in the list may be constant or variable. The contents of the list are updated as a function of the page being displayed and the navigation system used, and the updating is done whenever the display of a new page is requested by the user or whenever an updating of the information on the navigation system is received. The updating can be received after the display of a new page. The updating of the list of pages requested is done by an external list management circuit, which is not shown in FIG. 1.

The decoder 11 receives the digital data pertaining to a page of the service, decodes them and extracts the corresponding reference number. The filter 12 compares the reference number of the page received with the data on the list of pages requested, and if the received page is a requested page, then the filter 12 sends the memory 14 a storage control signal. The memory 14 stores the received page given by the decoder 11 when it receives the storage control signal. Upon the user's request, a page stored in the data memory 14 is then stored in the display memory 15. The display means 16 constantly reads the contents of the display memory 15 and copies them on the screen 17.

When the user requests the display of a page on the screen, the mean time needed for the appearance of this page on the screen depends essentially on the size of the data memory 14. If a requested page is already stored in the data memory 14, then the display of this page is immediate. If, on the contrary, the requested page is not stored in the memory 14, then it is necessary to wait for reception of this page to see it appear on the screen. The wait may be relatively lengthy, given that the same page is broadcast approximately every 40 seconds.

The size of the memory 14 is highly variable, between 1 and 500 kilobytes, for example. For an average quality circuit 10, a memory of about 10 kilobytes is used, which enables the storage of about ten service pages. This choice results from a compromise between, firstly, the size (in terms of silicon surface area) and the cost of the memory, and secondly, the user's comfort which is directly related to the mean time of display of a page. The choice of the elements of the list of the requested pages reduces the mean display time of a page, given that there is a very high probability that the user will request the display of one of these pages.

One problem appears, however, when the data memory 14 is too small to store all the pages of the list of the requested pages. All the pages of the list are stored in the memory as soon as they are received. Consequently, if a new requested page is received and if the space that is still free in the memory 14 is not enough to store the new received page, then either a previously stored page is totally or partially erased and replaced by the last page received, or else the last page received is not stored.

This is particularly inconvenient for the user because it is possible that the pages closest to the page being displayed will be erased during the storage of a new requested page. When the user requests the display of a nearby page of the displayed page (the most probable assumption), and if this page to be displayed has been totally or partially erased from the memory 14, or if this page to be displayed has not been stored, then the user must wait for the next transmission of this page to be displayed before seeing it appear on the screen. The user's comfort is thus seriously degraded.

It may be recalled that the expression "closer to" must be understood as follows: a page 1 is closer to a page X then a page Y2 if, when the page X is displayed, the probability that the user will request the display of the page Y1 is higher than the probability that the user will requests the display of the page Y2. For example, pages 199, 201 are considered to be closer to page 200 than pages 198, 202.

This problem of the erasure of data in the memory arises frequently if the list of the requested pages contains a variable number of references. This problem is also frequent with the new versions of teletext services for which the size (in terms of memory space) of each page may vary greatly. It is then very difficult to foresee the exact number of pages that the memory 14 may contain, because this number can vary as a function of the pages to be stored.

To resolve this problem, it is possible to limit the list of the pages requested to a fixed number of pages on the basis, for example, of a page size equal to the maximum size of a page of a service. In this case, the total number of stored pages will be necessarily small. This increases waiting risks for the viewer, and therefore, reduces comfort.

It is also possible to choose a mean number of requested pages. In this case, the risks of the overwriting of data in the memory are high, and therefore, the waiting risks for the viewer are also increased. Thus, the approaches currently used for the storage of teletext pages are not satisfactory because they cannot be used for the most efficient optimizing of the contents of the memory while at the same time achieving the maximum reduction of possible discomforts for the viewer.

SUMMARY OF THE INVENTION

In view of the foregoing background, an object of the present invention is to reduce the average display time for a teletext page to heighten a user's comfort, and to achieve this without increasing the size of the data memory as compared with existing circuits, namely by limiting their size (in terms of silicon surface area) and the cost of the circuit.

Another object of the invention is to implement a storage method and make an associated storage circuit that takes account of the size of the pages to be stored and the probability that a page will be requested by the viewer.

Another object of the invention is to implement a method of storage and make an associated storage circuit that keeps in memory at least the pages closest to the page under displayed, and does so regardless of the page being displayed.

These and other objects, advantages and features of the invention are provided by a method for the storage of pages of a teletext service, with at least one page being received by a storage circuit of a television receiver, and the storage circuit comprises a data memory to store the at least one received page. The method comprises a step for the extraction of a reference number from the received page, a step to check whether the received page is a requested page, and a step for the storage of the received page.

According to the invention, the method also comprises a step for evaluating the contents of the data memory to decide whether the received page must be stored as a function of the free space in the data memory and the importance of the received page. The evaluation step is performed after the checking step, and the storage step is carried out if the received page has to be stored.

Thus, the method of the invention takes account of the place available in the data memory, and the importance of the received page to decide whether the received page must be stored or not. A page X is said to be important if it is close to a selected page Y (for example, a displayed page) that is selected by a user, namely if the probability is high that the user will select the page Y after having selected the page X.

Thus, with the invention, the important pages are stored as a priority if the space in the data memory is limited. Consequently, the probability that the user will ask for a page not contained in the data memory is reduced and the user's comfort is increased accordingly.

According to one embodiment, the step for evaluating the contents of the memory comprises the following steps. Step E31 is the comparison of the size of the free space in the data memory with the size of the received page and then, if the size of the free space is smaller than the size of the received page, then step E32 is performed, which is the study of the importance of the received page.

The importance of the received page is taken into account only if the free space in the memory is not enough to store the received page. The step E32 for studying the importance of the received page can be sub-divided as follows. Step E32.1 is the comparison of a priority number of the received page with a priority variable equal to the priority number of the lowest-priority page contained in the data memory. If the priority number of the received page is smaller than the priority variable, then a new extraction step is performed, otherwise, the step E32 ends.

As the case may be, the step E3 for evaluating the contents of the memory also comprises a step E33 for the erasure of the lowest-priority page contained in the data memory. The erasure step E33 is performed after the step E32, and the erasure step E33 is performed if the received page has a priority number that is more important than the priority variable. The step E3 is complemented by an updating step E34 for updating the priority variable performed after the step E31, or after the step E32, or after the step E33.

According to another embodiment, a new step E31 is performed after the step E34 if a step E32 has been performed during the step E3. This makes it possible to verify that the released memory space is sufficient to store the received page.

The invention also relates to a television receiver comprising storage means to implement the data storage method described above.

The invention also relates to a circuit for the reception and display of teletext pages, with the circuit comprising a storage circuit comprising a decoder to receive a page of a teletext service and to extract therefrom a reference number of the received page, and a data memory to store the received page.

According to the invention, the storage circuit also comprises a filter to verify whether the received page is a requested page, and to provide the priority number of the received page. A memory management circuit receives the priority number of the received page, and causes the received page to be stored if the size of a free space of the data memory is sufficient, or if not, then the study of the importance of the received page is performed.

Preferably, the memory management circuit comprises means to compare the size of the free space of the data memory with the size of the received page. To study the importance of the received page, the memory management circuit preferably has means to compare the priority number of the received page with a priority variable equal to a priority number of a lower-priority page contained in the data memory.

Finally, the invention also relates to a television receiver comprising a circuit for the reception and display of teletext pages as described above.

BRIEF DESCRIPTION OF THE DRAWINGS

The invention will be understood more clearly and other characteristics and advantages shall appear from the following description, made with reference to the appended drawings, of which.

DETAILED DESCRIPTION OF THE PREFERRED EMBODIMENTS

Figure 2:
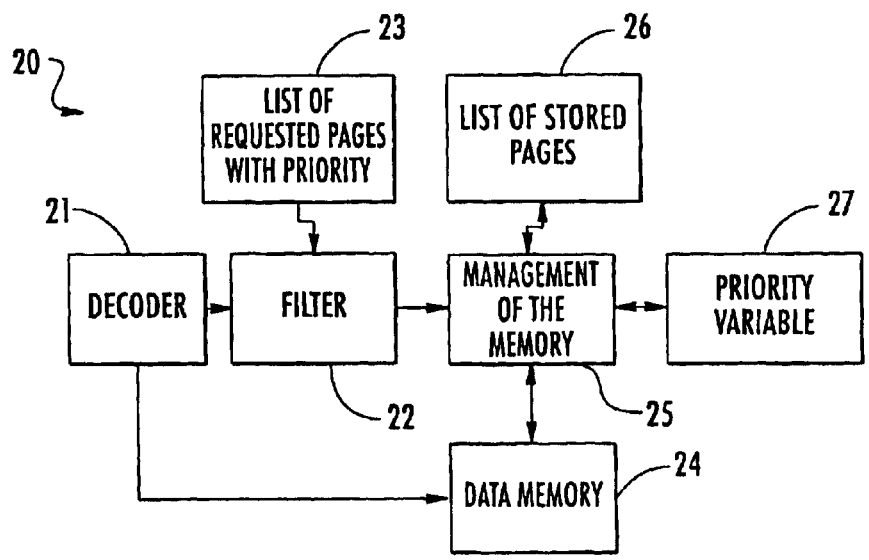
FIG. 2 is a functional diagram of a storage circuit according to the invention.

The storage circuit 20 of FIG. 2 has a decoder 21, a filter 22, a memory 23, a data memory 24, a data memory management circuit 25, a memory 26 and a memory 27. The storage circuit 20 is integrated into a larger device for the reception and display of teletext pages. This device comprises a data reception circuit, a display circuit (not shown) and a storage circuit such as that of FIG. 2.

Figure 1:
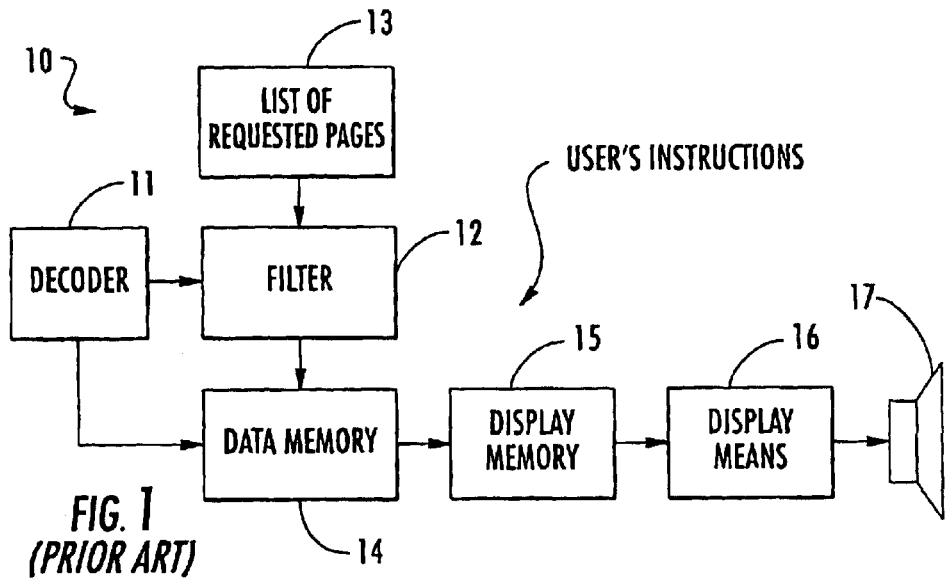
FIG. 1 is a functional diagram of a device used for the reception and display of pages of a teletext service according to the prior art.

The reception circuit has an antenna associated with the detection circuit to receive a video signal, extract the data pertaining to a teletext service from the video signal and give the data to the decoder 21. The display circuit has a display memory, display means and a screen of the kind shown in FIG. 1. The display memory is connected to the data memory 24 of the storage circuit of the invention. The detection circuit and the display circuit are neither described nor shown, because they are readily known by those skilled in the art.

The memory 23 is connected to the filter 22 to give it the list of pages requested from the teletext service. This is a novel list, different from the one commonly used in the prior art circuits. Each page here is identified by its reference number (or page number) and also by an associated priority number that defines the degree of proximity of the page to the page being displayed, with the page under display having a maximum degree of priority. If a page of the service is very close to the page being displayed, then a high-priority number is associated with it. Conversely, if the page is very far from the page being displayed, then a low-priority number is assigned to it.

For example, if page 155 relating to the results of the latest tennis tournament is displayed on the screen, the priority number 0 is assigned to it. The priority number 1 is then assigned to the nearest pages 154 and 156, the priority number 2 is assigned to the following pages 153 and 157, as well as to the links of the TOP, FLOF, and other navigation modes. Priority numbers are also assigned to pages corresponding to the first page of each block of the service, for example, page 125 corresponding to the sports block, page 275 corresponding to the daily news block, page 150 corresponding to the tennis group, etc.

The reference number contained in the list may be constant or variable. The contents of the list are updated whenever the display of a new page is requested by the user. The updating is done by an external list management circuit not shown in FIG. 2.

The updating of the list includes determining which are the pages closest to the new page displayed and in assigning them a new priority number. The updating is done as a function of the page being displayed, the contents of the teletext service being received (total number of pages, hierarchical organization of the pages, etc.) and the navigation system used. Several pages may have the same priority number. Furthermore, the priority number of the same page may vary if the page being displayed varies.

The memory 24 is connected, first, to the decoder 21 to receive the pages of the teletext service, and secondly, to the memory management circuit 25 to receive storage instructions. The memory 24 includes pages of the teletext service which are stored when they are received as a function of the instructions received from the memory management circuit 25. The memory 24 includes a number of pages that varies, especially as a function of the page being displayed and the size (in terms of memory space) of the pages close to the page being displayed.

The memory 26 is connected to the management circuit of the memory. The memory 26 includes a list of the pages contained in the data memory 24, the list includes, for example, for each stored page its reference number, its associated priority number and its address in the data memory 24. The contents of the memory 26 vary as and when the requested pages are stored and they are updated by the management circuit 25.

The memory 27 is connected to the memory management circuit 25. It is used to store a variable PMIN that is equal to the priority number of the lowest-priority page stored in the data memory 24. For example, if the data memory 24 includes pages with priority 0, 1, 2 and 3, then PMIN.=3.

In the example of FIG. 2, the memories 23, 24, 26 and 27 are considered to be different memories, each storing a different piece of information. However, these memories can be replaced by a single memory comprising for example, in different memory zones, the list of the requested pages, the list of the stored pages, the variable PMIN. and the previously stored teletext pages.

Figure 3:
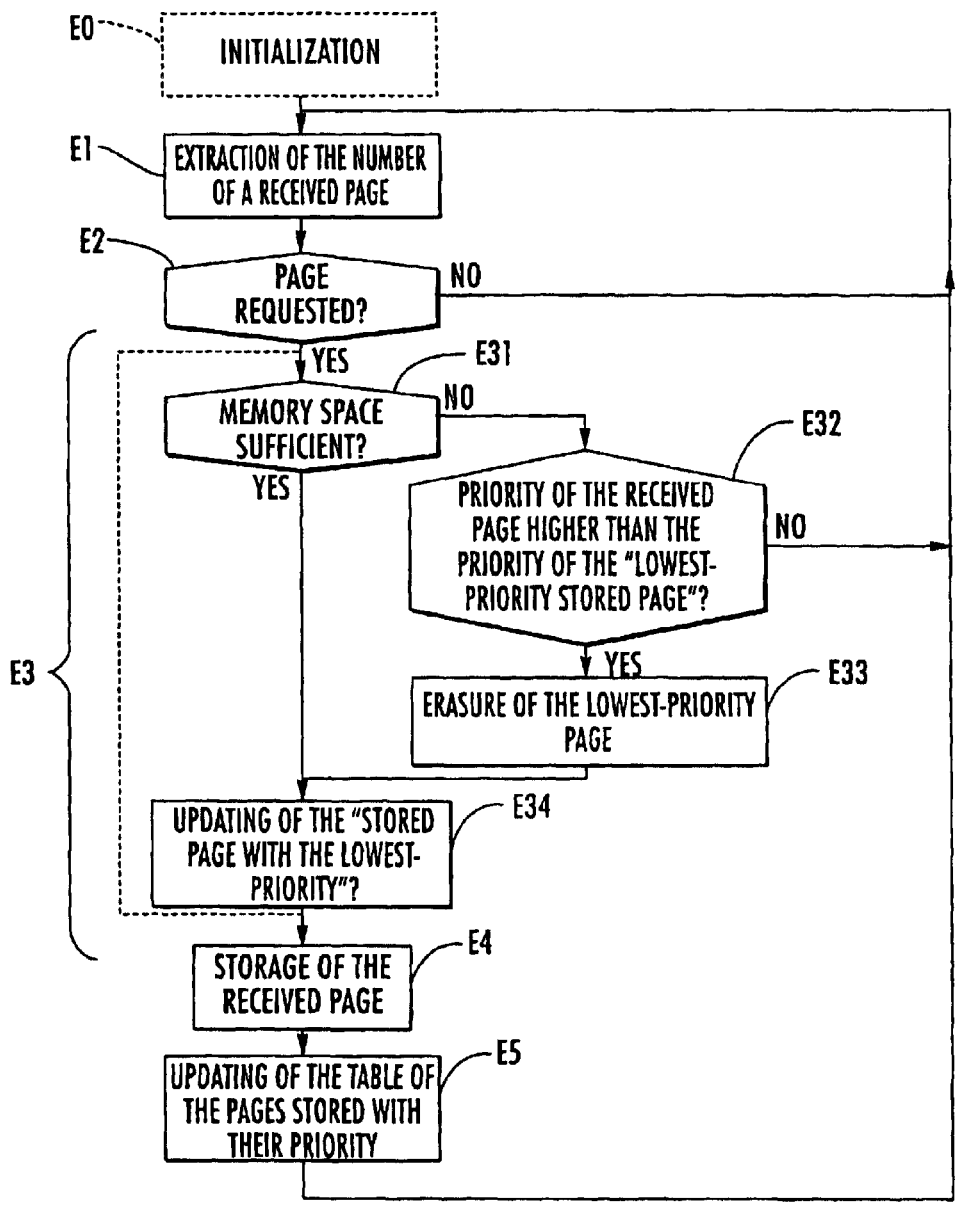
FIG. 3 is a flow chart for a storage method according to the invention.

The circuit of FIG. 2 is used to implement the method of the invention, an exemplary diagram of which is shown in detail in FIG. 3. It is assumed in the following example that a page is being displayed on the screen, and that a list of requested pages, a list of stored pages and the priority number (PMIN.) of the lowest-priority page are stored respectively in the memories 23, 24, 26, 27.

During a step E1, the decoder 21 receives data pertaining to a teletext page, and extracts a reference number (or page number) of the received page therefrom. During a step E2, the filter 22, using the reference number of the received page and the list of requested pages contained in the memory 23, verifies that the received page is a requested page. If the received page is a requested page, then a step E3 is performed. If not, a new step E1 is performed.

During a step E3 for evaluating the contents of the memory, the memory management circuit 25 decides whether the received page must be stored or not, depending on the place available in the data memory 24 and the priority number of the received page. If the received page does not have to be stored, then a new step E1 is carried out. Otherwise, a step E4 is carried out. During the next step E4, the received page is stored in the data memory 24, and then the list of already stored pages is updated by the management circuit 25 during a step E5. Finally, a new step E1 is carried out.

The method is executed cyclically. It may be interrupted at any time by the user, by an end instruction externally given, such as from a remote control, for example. According to a first embodiment, the step E3 for evaluating the contents of the data memory 24 can be divided into four sub-steps E31 to E34.

During the steps E31, the management circuit 25 verifies that the space still available in the memory 24 is sufficient to store the received page. If the free space is sufficient, then the step E34 is carried out. Otherwise, the step E32 is carried out. During the step E32, the management circuit 25 compares the priority number of the received page with the variable PMIN. of the memory 27, namely with the priority number of the lowest-priority page contained in the memory 24.

If the priority number of the received page is higher than PMIN., then it is estimated that the received page is less important than the already stored pages, namely that the received page is further away from the page being displayed then the pages already stored in the memory 24. It is then less probable that the viewer will ask for the display of the received page rather than the display of one of the already stored pages. It is estimated in this case that it is not necessary to store the received page. The step E32 is then interrupted and a new step E1 is performed.

Conversely, if the priority number of the received page is smaller than PMIN., then it is estimated that the received page is more important than at least one of the already stored pages. Namely, that the received page is closer to the page being displayed than at least one of the already stored pages. It is then more probable that the viewer will ask for the display of the received page rather than the display of some of the already stored pages, especially the display of the page with the lowest priority. In this case, it is estimated that it is not necessary to keep the lowest-priority page in memory and that, on the contrary, it is indispensable to store the received page.

Thus, if the priority number of the received page is smaller than the priority number of the already stored lowest-priority page, the step E33 is performed to erase the lowest-priority page of the data memory 24, and thus release space in the memory 24. During the step E34, the variable PMIN contained in the memory 27 is updated. It is then equal to the priority number of the lowest-priority new page. The step E34 is performed either after a step E31 or after a step E33.

According to another embodiment of the step E3, the step E3 is repeated if the response to the previous test E31 is negative. The step E3 is even repeated several times if necessary until a positive response to the test E31 is obtained. This embodiment is particularly valuable if the pages of the teletext service have different sizes. In this case it is possible that the received page to be stored will be more important than the lowest-priority page. It is then preferable to ascertain that the memory space released during the performance of a step E33 is sufficient to store the received page.

Other variations and improvements of the method of the invention can be planned. For example, the step E33 is performed to erase a page of the memory 24 and thus release space for a page closer to the displayed page. It is possible to eliminate this step, and during the performance of the step E34, simply overwrite the data pertaining to the page to be erased.

It is also possible to carry out a step E0 for initializing the method during which one or more of the following sub-steps may be performed. The initialization of the list of requested pages for storing the references of the contents page in the memory 23 is performed. The initialization of the list of requested pages for storing the references of the contents page and the references of the first pages of the different blocks of the service received in the memory 23 are also performed. The priority number 0 (maximum priority) is assigned to the contents page and the priority number 1 is assigned to the first pages of the blocks, for example. The initialization of the list of the stored pages and of the variable PMIN, and then the erasure of the data memory 24 are also performed.

In the example described above, the priority numbers are assigned to the pages of the service as follows: priority 0 for the maximum-priority page (the displayed page), priority 1 for the pages very close to the displayed page, and priority 2 for the slightly higher pages, etc. It is of course possible to assign the priority numbers in a different order, such as the example priority 100 for the maximum-priority (the displayed page), priority 99 for the pages very close to the displayed page, and priority 98 for the slightly higher pages, etc. In this case, it will be seen that the step 32 is adapted accordingly. What is essential is that during this step, it will be determined whether or not the received page is less important than the already stored pages. It may be recalled that a page X is more important than the page Y if the page X has higher priority than the page Y, namely if the page X is nearer than the page Y displayed or requested by the user.

That which is claimed is:

1. A method for storing pages from a teletext service with at least one page being received by a storage circuit of a television receiver, the storage circuit comprising a data memory for storing the at least one received page, the method comprising:
   extracting a reference number from the at least one received page;
   checking whether the at least one received page is a requested page;
   evaluating contents of the data memory to decide whether the at least one received page is to be stored, the evaluating being based upon free space in the data memory and an importance of the at least one received page; and
   storing the at least one received page if it is decided that the at least one received page is to be stored.

2. A method according to claim 1, wherein evaluating contents of the data memory comprises comparing a size of the free space in the data memory with a size of the at least one received page, and if the size of the free space is smaller than the size of the at least one received page, then further comprising studying the importance of the at least one received page.

3. A method according to claim 2, wherein studying the importance of the at least one received page comprises:
   comparing a priority of the at least one received page with a priority variable equal to a priority of a lowest-priority page stored in the data memory; and
   if the priority of the at least one received page is smaller than the priority variable, then a reference number is extracted from a new received page;
   otherwise, the study of the importance of the at least one received page is completed.

4. A method according to claim 3, wherein evaluating the contents of the data memory further comprises erasing the lowest-priority page stored in the data memory after studying the importance of the at least one received page if the at least one received page has a priority that is higher than the priority variable.

5. A method according to claim 4, wherein during evaluating the contents of the data memory, the priority variable is updated.

6. A method according to claim 5, wherein if studying the importance of the at least one received page is performed during the evaluation of the contents of the data memory, a new step of comparing the size of the free space in the data memory with the size of the at least one received page is performed after the priority variable is updated.

7. A method according to claim 1, further comprising updating a list of the pages stored in the data memory after storing the at least one received page therein and before extracting a reference number from a new received page.

8. A method for storing at least one received page from a teletext service comprising:
   extracting a reference number from the at least one received page using a television receiver comprising a storage circuit comprising a data memory for storing the at least one received page;
   checking whether the at least one received page is a requested page;
   evaluating contents of the data memory to decide whether the at least one received page is to be stored, the evaluating comprising comparing a size of a free space in the data memory with a size of the at least one received page; and
   storing the at least one received page if it is decided that the at least one received page is to be stored.

9. A method according to claim 8, wherein the evaluating further comprises studying the importance of the at least one received page if the size of the free space is smaller than the size of the at least one received page.

10. A method according to claim 9, wherein studying the importance of the at least one received page comprises:
    comparing a priority of the at least one received page with a priority variable equal to a priority of a lowest-priority page stored in the data memory; and
    if the priority of the at least one received page is smaller than the priority variable, then a reference number is extracted from a new received page;
    otherwise, the study of the importance of the at least one received page is completed.

11. A method according to claim 10, wherein evaluating the contents of the data memory further comprises erasing the lowest-priority page stored in the data memory after studying the importance of the at least one received page if the at least one received page has a priority that is higher than the priority variable.

12. A method according to claim 11, wherein during evaluating the contents of the data memory, the priority variable is updated.

13. A method according to claim 12, wherein if studying the importance of the at least one received page is performed during the evaluation of the contents of the data memory, a new step of comparing the size of the free space in the data memory with the size of the at least one received page is performed after the priority variable is updated.

14. A method according to claim 8, further comprising updating a list of the pages stored in the data memory after storing the at least one received page therein and before extracting a reference number from a new received page.

15. A storage circuit for receiving and displaying pages from a teletext service, and comprising:
    a decoder for receiving a page from the teletext service and for extracting therefrom a reference number of the received page;
    a data memory connected to said decoder for storing the received page;
    a filter connected to said decoder for verifying whether the received page is a requested page and for providing a priority of the received page; and
    a memory management circuit connected to said filter for receiving the priority of the received page, said memory management circuit causing the received page to be stored in said data memory if a size of free space of said data memory is sufficient, or otherwise studying an importance of the received page.

16. A storage circuit according to claim 15, wherein said memory management circuit compares the size of the free space of said data memory with a size of the received page.

17. A storage circuit according to claim 15, wherein said memory management circuit studies the importance of the received page by comparing the priority of the received page with a priority variable equal to a priority of a lowest-priority page stored in said data memory.

18. A storage circuit according to claim 15, wherein said memory management circuit updates a list of the stored pages, with each stored page including a corresponding priority.

19. A storage circuit according to claim 15, wherein said memory management circuit updates a lowest-priority page stored in said data memory.

20. A television receiver comprising:
    a storage circuit for receiving and displaying pages from a teletext service, and comprising
    a decoder for receiving a page from the teletext service and for extracting therefrom a reference number of the received page,
    a data memory connected to said decoder for storing the received page,
    a filter connected to said decoder for verifying whether the received page is a requested page and for providing a priority of the received page, and
    a memory management circuit connected to said filter for receiving the priority of the received page, said memory management circuit causing the received page to be stored in said data memory if a size of free space of said data memory is
    sufficient, or otherwise studying an importance of the received page.

21. A television receiver according to claim 20, wherein said memory management circuit compares the size of the free space of said data memory with a size of the received page.

22. A television receiver according to claim 20, wherein said memory management circuit studies the importance of the received page by comparing the priority of the received page with a priority variable equal to a priority of a lowest-priority page stored in said data memory.

23. A television receiver according to claim 20, wherein said memory management circuit updates a list of the stored pages, with each stored page including a corresponding priority.

24. A television receiver according to claim 20, wherein said memory management circuit updates a lowest-priority page stored in said data memory.

* * * * *